US012604970B2

(12) United States Patent
Timmermans et al.

(10) Patent No.: US 12,604,970 B2
(45) Date of Patent: Apr. 21, 2026

(54) ADHESIVE MOUNT FOR A DEVICE

(71) Applicant: Kiiroo BV, Amsterdam (NL)

(72) Inventors: Toon Timmermans, Amsterdam (NL); Wilmer Montiel, Amsterdam (NL); Antonio Lo Presti, Amsterdam (NL)

(73) Assignee: Kiiroo BV, Amsterdam (NL)

( * ) Notice: Subject to any disclaimer, the term of this patent is extended or adjusted under 35 U.S.C. 154(b) by 140 days.

(21) Appl. No.: 18/388,346

(22) Filed: Nov. 9, 2023

(65) Prior Publication Data

US 2025/0151885 A1 May 15, 2025

(51) Int. Cl.
*A45F 5/00* (2006.01)
*A61H 19/00* (2006.01)
*A61H 23/00* (2006.01)

(52) U.S. Cl.
CPC ............... *A45F 5/00* (2013.01); *A61H 19/00* (2013.01); *A61H 23/00* (2013.01); *A61H 2201/165* (2013.01)

(58) Field of Classification Search
CPC . A61B 5/6833; A61B 5/282; A61B 2562/164; A45F 5/00; A45F 5/1516; Y10S 224/901
USPC .......................................................... 224/901
See application file for complete search history.

(56) References Cited

U.S. PATENT DOCUMENTS 3,213,506 A * 10/1965 Fernberg ............. F16B 19/1081 24/289
5,551,612 A * 9/1996 Hochfeld ................ A61F 6/005 224/101
7,878,706 B2 * 2/2011 Koch ................. G04B 37/1486 368/282
8,613,709 B2 12/2013 Bishay
8,626,260 B2 * 1/2014 Crosby .................. A61B 5/282 600/394
9,571,907 B2 * 2/2017 Slack ..................... G16H 40/63
10,433,748 B2 * 10/2019 Bishay ................... A61B 5/282
10,864,367 B2 * 12/2020 Perez ................. A61N 1/36014
11,284,831 B2 * 3/2022 Toth ....................... A61B 5/259
11,471,107 B2 * 10/2022 Chang .................... A61B 5/339
2001/0007061 A1 * 7/2001 Bierman ............... A61M 25/02 128/898
2008/0288026 A1 * 11/2008 Cross ................. H01R 13/5224 607/60
2019/0223749 A1 7/2019 Toth
2021/0275097 A1 * 9/2021 Pushpala .............. A61B 5/1495
2023/0263428 A1 8/2023 Hull

FOREIGN PATENT DOCUMENTS

EP 3150114 B1 11/2022
KR 20090008786 A * 1/2009 ........... A61B 5/6833

OTHER PUBLICATIONS

KR-20090008786-A with translation (Year: 2009).*

* cited by examiner

*Primary Examiner* — Adam J Waggenspack
(74) *Attorney, Agent, or Firm* — Jason P. Mueller; FisherBroyles, LLP

(57) ABSTRACT

An adhesive mount for attaching a device to the skin of a body includes a flexible adhesive layer having a first side that is configured to adhere to skin and one or more mounting elements that extend away from the second side of the flexible adhesive layer. The one or more mounting elements have distal ends configured to couple to attaching elements of a device that is to be mounted to the adhesive mount.

20 Claims, 5 Drawing Sheets

ADHESIVE MOUNT FOR A DEVICE

BACKGROUND OF THE INVENTION

The invention is related to a mount for temporarily attaching a device to a body. The device which is to be temporarily attached to a body could be virtually anything. However, the invention has particular applicability to temporarily attaching to a body an electrically operated device designed to provide sexual stimulation.

In the past, an electronic device could be temporarily attached to a body via a harness that includes adjustable straps and/or strings designed to surround and be attached to various parts of a person's body. Such harness devices were often designed such that the length and configuration of the straps and/or strings could be varied to accommodate a wide range of different sized and shaped bodies. Elements of such a harness device also could be elastic in nature to help accommodate different sized and shaped individuals.

In other instances, a device used to temporarily attach an electronic device to a body could be in the nature of an article of clothing, where means were provided to attach the electronic device to the article of clothing. The user would then wear the article of clothing, which resulted in the electronic device being temporarily attached to or mounted upon the user's body.

Each of the existing means for temporarily attaching a device to a person's body has various drawbacks. Most existing devices do not keep a device firmly attached to a specific part or region of a person's body unless the attaching mechanism is uncomfortably tight. This is particularly true when the person is moving on a regular basis, which tends to cause the mounted device to move with respect to the person.

Also, the mounting devices themselves, be it a harness or something designed to mimic an article of clothing, are often uncomfortable to wear, particularly for extended periods of time. Further, existing mounting devices can restrict a person's ability to move in a natural and comfortable manner.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

Various embodiments of an adhesive mount that can be used to attach a device to a person's skin are disclosed herein. Typically, the adhesive mount will be disposable in nature, being used once and then discarded. In some embodiments, however, the adhesive may be configured such that the adhesive mount can be reused.

Figure 1:
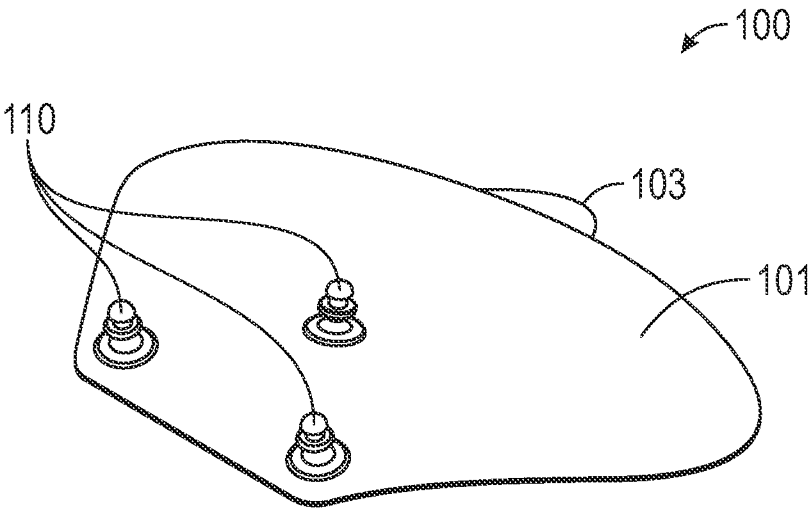
FIG. 1 is a perspective view of an adhesive skin mount that can be used to attach a device to the skin of a body.

FIG. 1 illustrates a first embodiment of an adhesive mount 100. The adhesive mount 100 includes a multilayer structure 101 that includes an adhesive layer that is used to affix the adhesive mount to a person's skin, as discussed in greater detail below. In some embodiments, the adhesive layer will extend across the majority of the side of the multilayer structure 101 that contacts the person's skin. In other embodiments, the adhesive layer may only be located on selected portions of the multilayer structure 101, such as around the peripheral edge.

Figure 2:
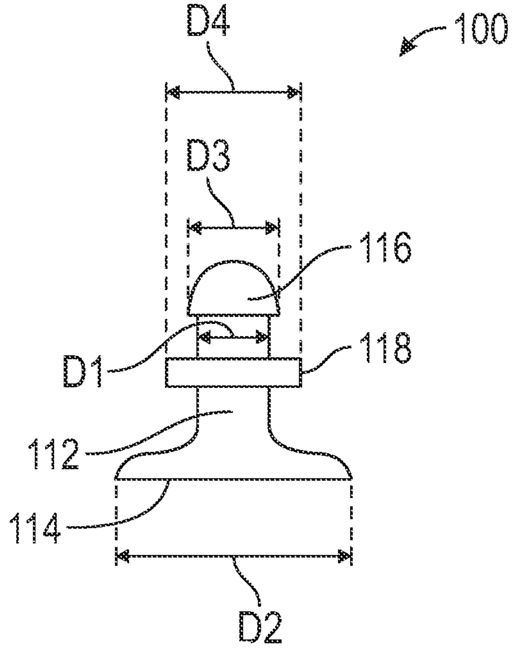
FIG. 2 is a diagram of a mounting element that can be a part of an adhesive skin mount as depicted in FIG. 1.

Mounting elements 110 are integrated into the adhesive mount 100. The mounting elements are configured to attach to corresponding securing elements of a device so that the device can be attached to the adhesive mount. The specific way in which the mounting elements 110 are configured to attach to the securing elements of a device can vary. In the embodiment illustrated in FIG. 1, the mounting elements 110 are shaped as depicted in FIG. 2.

The adhesive mount 100 may be delivered in a condition where a release layer covers the adhesive layer of the multilayer structure 101. To use the adhesive mount 100, the release layer would be removed from the adhesive mount 100 and the adhesive mount 100 would be positioned over a desired portion of a person's skin. The adhesive on the adhesive mount 100 would then be brought into contact with the person's skin so that the adhesive adheres the adhesive mount 100 to the person' skin. A device would then be attached to the adhesive mount using the mounting elements 110.

As mentioned above, the device that is attached to the adhesive mount 100 could be an electronic device that is configured to provide sexual stimulation. In that instance, the device could be designed or configured to contact a specific part of a person's body. For that reason, it would be necessary to attach the adhesive mount to the skin of a person's body such that when the device is attached to the adhesive mount 100, the device will be properly positioned to provide sexual stimulation to the proper part of the person's anatomy.

In this embodiment, no adhesive is applied to a removal tab 103 of the multilayer structure 101. Once the adhesive mount 100 is attached to a person's skin, the person can easily grasp the removal tab 103 to begin peeling the adhesive mount 100 off the person's skin during a removal process.

As shown in FIG. 2, each mounting element 110 is configured as a post having a base 114, a shaft 112 that extends upward away from the base 114 and a head 116 located and the distal end of the shaft 112. The shaft 112 has a first diameter D1. The base 114 has a second diameter D2 that is larger than the first diameter D1. The head 116 has a third diameter D3 that is larger than the first diameter D1, but smaller than second diameter D2.

In the embodiment illustrated in FIG. 2, the mounting element 100 also includes a collar 118. The collar is an optional feature that may or may not be provided on the mounting element 110. When provided, the collar 118 may have a fourth diameter D4 that is larger than the third diameter. However, in an alternate embodiment (not shown), the diameter of the collar 118 could be the same as or smaller than the third diameter D3 of the head 116.

The mounting element 110 is designed to be received in a securing element of a device. The securing element of the device would include a receptacle that is configured to receive the upper end of the mounting element 110. The securing element of the device would also include one or more flexible or elastically mounted fingers that can flex to allow the head 116 of the mounting element 110 to enter the receptacle, and which ultimately come to rest against or near to the shaft 112 under the head 116. When a collar 118 is provided on the mounting element 110, the one or more fingers would come to rest between the head 116 and the collar 118.

Interference between the underside of the head 116 and the one or more fingers of the securing element of the device prevents the mounting element 110 from being easily removed from the receptacle on the device. However, when sufficient force is applied in a direction that tends to remove the mounting element 110 from the receptacle on the device, the one or more fingers will flex or move so that the mounting element 110 can be removed from the receptacle on the device.

FIGS. 1 and 2 illustrate but one configuration for a mounting element 110 that can be used to attach a device to an adhesive mount. The mounting elements 110 could have any of a nearly infinite variety of different configurations that correspond with securing elements of a device that is to be attached to the adhesive mount 100. A few mounting element alternatives are described and discussed below. However, the examples provided herein are not intended to be exhaustive. Any sort of mounting element that can be used to attach a device to the adhesive mount could be used and still fall within the spirit and scope of the present disclosure.

Figure 3A:
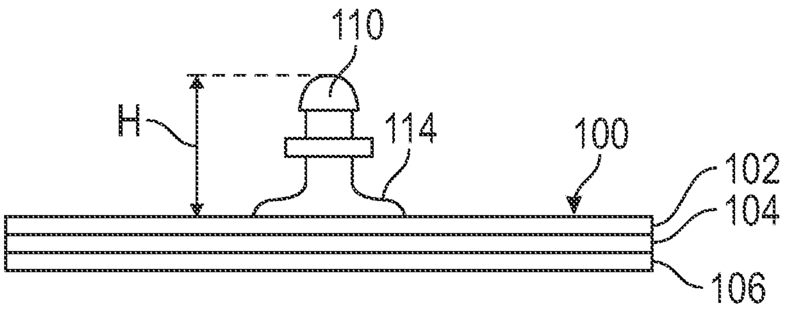
FIG. 3A is a diagram of a portion of a first embodiment of an adhesive skin mount illustrating how a mounting element is integrated into the layers of the first embodiment of the adhesive skin mount.
Figure 3B:
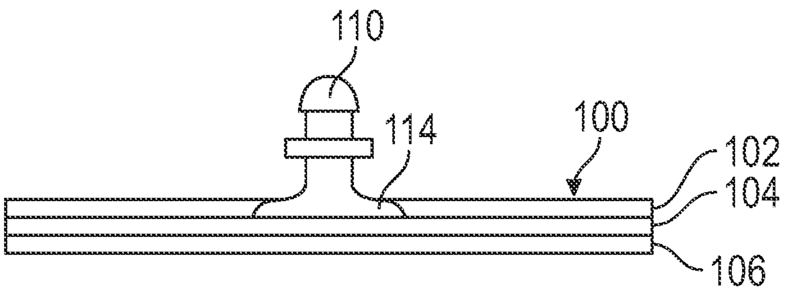
FIG. 3B is a diagram of a portion of a second embodiment of an adhesive skin mount illustrating how a mounting element is integrated into the layers of the second embodiment of the adhesive skin mount.
Figure 3C:
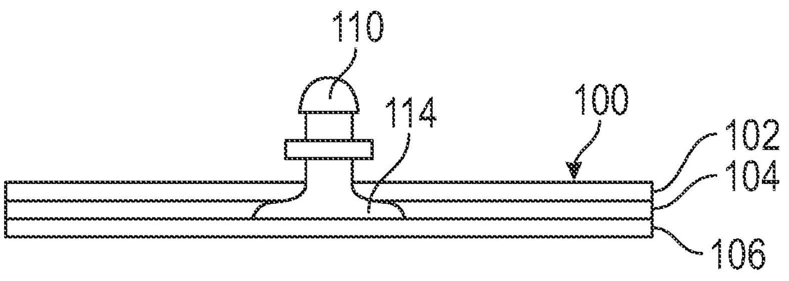
FIG. 3C is a diagram of a portion of a third embodiment of an adhesive skin mount illustrating how a mounting element is integrated into the layers of the third embodiment of the adhesive skin mount.

FIGS. 3A-3C each illustrate a portion of the multilayer structure 101 of the adhesive mount 100. The three views in FIGS. 3A-3C depict three different alternative ways in which a mounting element 110 can be integrated into the multilayer structure 101.

In each of the embodiments illustrated in FIGS. 3A-3C, the multiplayer structure includes a flexible layer 102, an adhesive layer 104 and a removable release layer 106. The adhesive layer 102 has a first side that is in contact with or that is attached to a first side of the flexible layer 102. The second side of the flexible layer 102 would be exposed as the top of the adhesive mount when the adhesive mount is attached the skin of a person.

A removable release layer 106 is attached to and protects the second side of the adhesive layer 104 before the adhesive mount if attached to an individual. The release layer 106 would typically be a film or paper that is configured such that it will remain attached to the adhesive layer 104 while the adhesive mount is being stored. However, the release layer 106 is configured to be easily removed from the adhesive layer 104 when it is time to attach the adhesive mount to the skin of a person.

As mentioned above, in some embodiments the adhesive layer 104 could extend across the majority of the flexible layer 102 of the multilayer structure 101 of the adhesive mount 100. Alternatively, the adhesive layer 104 could extend across only selected regions of the flexible layer 102 of the multilayer structure 101. For example, the adhesive layer 104 may only extend around the periphery of the flexible layer 102.

The release layer 106 may be configured to extend across the majority of the flexible layer 102, regardless of whether the adhesive layer 104 covers substantially all or only a portion of the flexible layer 102. Alternatively, if the adhesive layer 104 extends across only selected portions of the flexible layer1 102, the release layer 106 could be configured to correspond in size and shape to the adhesive layer 104 so that the release layer 106 only covers the portions of the flexible layer 102 that are also covered by the adhesive layer 104.

The adhesive layer can comprise any adhesive that will reliably adhere to a person's skin. The strength of the adhesive could be configured to firmly attach the adhesive mount 100 to a person's skin such that when a device is mounted to the adhesive mount 100 the device also will be secured to the person's skin. Different adhesive mounts could utilize different strength adhesives. For example, if the device to be attached to the adhesive mount is relatively light, a low strength adhesive could be used to ensure the device remains attached to the person's skin. A low strength adhesive might also be indicated if the person is not expected to frequently move or to move rapidly.

On the other hand, if the device to be attached to the adhesive mount is heavy, a stronger adhesive could be used to ensure that the heavier device remains attached to the person's skin. Similarly, of the user is expected to move frequently or to move rapidly, a stronger adhesive may be useful in ensuring that the attached device remains firmly attached to the user's skin. Thus, adhesive mounts can be manufactured with different strength adhesives to accommodate different devices or different operational conditions.

The adhesive layer 104 is also configured so that a person can remove the adhesive mount from their skin without the removal process being painful or harmful to the person's skin.

In some embodiments, a solvent in the form of a liquid or gel might be used to help remove the adhesive mount 100 from a person's skin. If the flexible layer 102 is permeable, a liquid or gel could be applied to the top surface of the flexible layer 102 and that applied material could permeate through the flexible layer 102 to reach the adhesive layer 104. The concept would be for the applied material to act on the adhesive layer 104 in such a way that the adhesive layer can more easily be removed from the person's skin.

For example, the adhesive layer 104 could be made from a water or alcohol soluble material. When it is time to remove the adhesive mount 100, the person could apply water or alcohol to the top of the flexible layer 102, and the water or alcohol would migrate through the flexible layer 102 down into the adhesive layer 104. The water or alcohol would then at least partially dissolve the adhesive layer 104, making it easier to remove the adhesive mount from the person's skin.

A mounting element 110 could be integrated into the multilayer structure 101 of the adhesive mount in various different ways. FIG. 3A depicts a first embodiment, in which the bottom of the base 114 of the mounting element 110 is attached to the top surface of the flexible layer 102. The bottom of the base 114 could be attached to the top of the flexible layer 102 using an adhesive. If the flexible layer is made of a plastic material, the bottom of the base 114 of the mounting element 110 could be fused to the material of the flexible layer 102 via heat. These are but two examples, and the mounting element could be attached to the top of the flexible layer 102 in other ways.

FIG. 3B illustrates a second embodiment in which the bottom of the base 114 of a mounting element 110 is attached to the top surface of the adhesive layer 104. The lower part of the mounting element 110 protrudes through the flexible layer 102. The adhesive layer 104 could be the main way which in which the mounting element 110 is attached to the multilayer structure 101. However, the way in which the flexible layer 102 surrounds the bottom portion of the mounting element 110 could provide additional support to help hold the mounting element on the multilayer structure 101.

FIG. 3B illustrates another embodiment in which the base 114 of the mounting element is integrated into and surrounded by the adhesive later 104. The bottom portion of the mounting element 110 protrudes through both the adhesive layer 104 and the flexible layer 102. The contact between the base 114 and lower portions of the mounting element 110 and the adhesive layer 104 and flexible layer 102 hold the mounting element attached to the multilayer structure 101. In this embodiment, when the release layer 106 is removed from the adhesive layer 104 just prior to attaching the adhesive layer 104 to a person's skin, the bottom of the base 114 of the mounting element would be exposed. As a result, when the adhesive mount is attached to the person's skin, the bottom surface of the base 114 of the mounting element 110 will be in contact with the person's skin.

The mounting elements 110 of an adhesive mount 100 will be positioned to correspond to the securing elements of a device which is to be attached to the adhesive mount 100. Thus, the number and locations of the mounting elements 110 are dictated by the configuration of the device which is to be attached to the adhesive mount. FIG. 1 illustrates one configuration where three mounting elements 110 are provided on the adhesive mount 100 in a generally triangular configuration.

Figure 4:
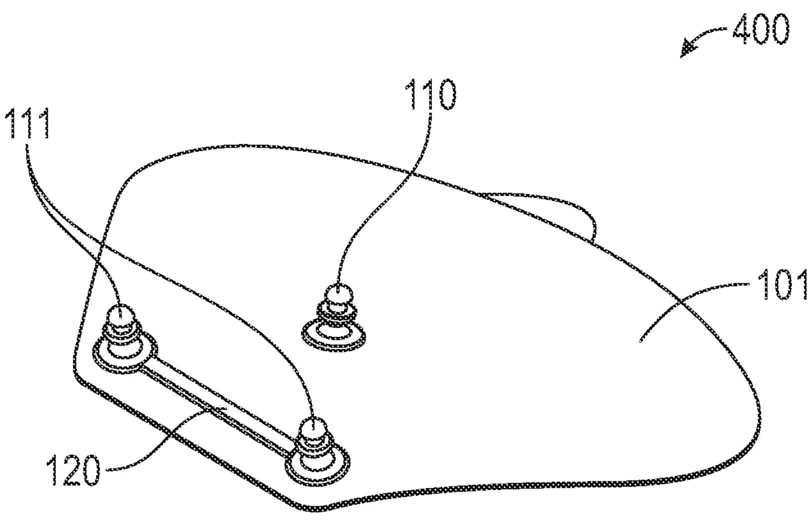
FIG. 4 is a perspective view of another embodiment of an adhesive skin mount where an anchor layer connects two of the mounting elements.

FIG. 4 illustrates another embodiment of an adhesive mount 400 that includes three mounting elements 110 arranged in a triangular configuration. However, in this embodiment an anchor layer 120 is provided, and two of the mounting elements 111 are mounted at ends of the anchor layer 120. The anchor layer 120 can serve one or multiple purposes.

The anchor layer 120 has a certain rigidity, which helps to ensure that the mounting elements 111 on the ends of the anchor layer 120 are held a fixed distance apart. This is important because the mounting elements 110/111 must engage with the securing elements of a device to attach the device to the adhesive mount 400. The device is almost certain to be rigid in nature, meaning the locations of the securing elements on the device are fixed. Thus, anchor layer 120 ensure that at least the mounting elements 111 on the ends of the anchor layer will be a fixed distance from each other, ensure that the mounting elements will correctly interface with corresponding securing elements on the device that is mounted to the adhesive mount 400.

The multilayer structure 101 of the adhesive mount 400 is generally flexible in nature. As a result, when the adhesive layer is pressed into engagement with a person's skin, it is possible for a portion of the multilayer structure to develop a wrinkle which slightly deforms the overall shape of the adhesive mount. The anchor layer 120 serves as a stiffening member that helps to ensure that the adhesive mount 400 retains its desired shape as it is applied to a person's skin. This too helps to ensure that the mounting elements 110/111 will be at the right spacing with respect to each other to correctly interface with corresponding securing elements of a device that is attached to the adhesive mount 400.

Figure 5:
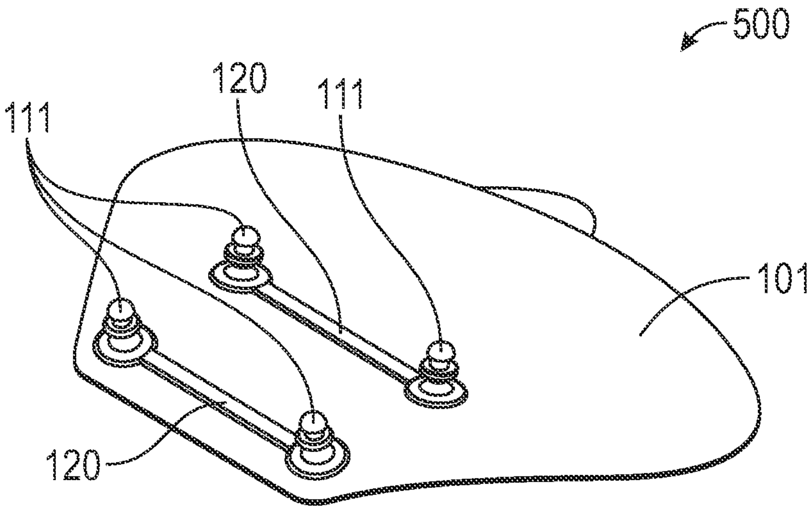
FIG. 5 is a perspective view of another embodiment of an adhesive skin mount where two anchor layers connect pairs of mounting elements.

FIG. 5 shows an alternate embodiment of an adhesive mount 500 which includes four mounting elements 111 and two anchor layers 120. In this embodiment, there are two mounting elements 111 on each end of each anchor layer 120. The anchor layers 120 help to ensure the adhesive mount 500 retains its proper shape and keeps pairs of the mounting elements 111 are a proper spacing with respect to each other.

The anchor layers 120 in the embodiments depicted in FIGS. 4 and 5 could be located in different parts of the multilayer structure 101 of the adhesive mounts, similar to how an individual mounting element 110 could be located at different locations within the multilayer structure 101. With reference to the multilayer structure depicted in FIGS. 3A-3C, in some embodiments the anchor layer(s) 120 could be located on a top surface of the flexible layer 102. The anchor layer(s) could be attached to the top surface of the flexible layer 102 with an adhesive, via fusing of the flexible layer 102 or via other means.

In other embodiments the anchor layer(s) 120 could be located between the flexible layer 102 and the underlying adhesive layer 104. As a result, the anchor layer(s) 120 could be firmly attached to the multilayer structure 101 via its contact with the adhesive layer 104. In this sort of embodiment, the lower portion of the mounting elements 111 would protrude upward through the flexible layer.

In yet other embodiments, the anchor layer(s) 120 could be attached to the bottom surface of the adhesive layer 104 and contact between the anchor layer(s) 120 and the adhesive layer 104 would firmly attach the anchor layer(s) 120 to the multilayer structure 101. In this type of embodiment, the lower portion of the mounting elements 111 would protrude upward through both the adhesive layer 104 and the flexible layer 102.

FIGS. 4 and 5 depict but two examples of how anchor or stiffening layers could be incorporated into the multilayer structure of an adhesive mount. In alternate embodiments anchor layers could be incorporated into the multilayer structure in other ways to help the adhesive mount retain a desired shape and to help ensure that the mounting elements are held in the proper position with respect to each other such that they will properly interface with a device being attached to the adhesive mount.

Figure 6:
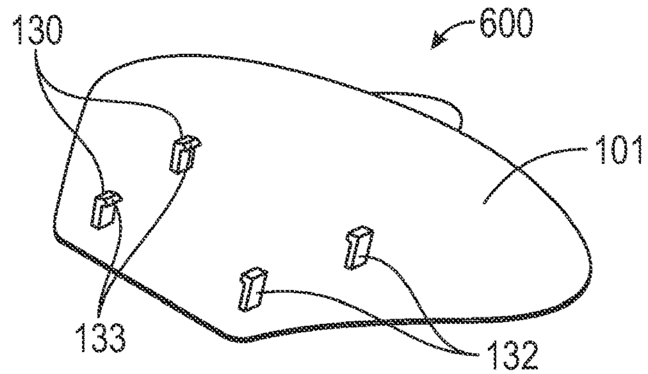
FIG. 6 is a perspective view of an embodiment of an adhesive skin mount where the mounting elements comprise protruding clips.

FIG. 6 shows another alternate embodiment of an adhesive mount 600 having a different type of mounting elements 132. In this instance, each mounting element 132 is a post with a retaining finger 133 at its distal end. The posts are somewhat flexible in nature such that the fingers 133 at the distal ends of the mounting elements 132 can move outward from a center of the adhesive mount 600. These types of mounting elements 132 could be used to help attach a device to the adhesive mount 600 where the device has apertures that are configured to receive the fingers 133 of the mounting elements 132. Alternatively, the device might include receptacles that receive the entire top parts of the mounting elements 132, and a recess in each receptacle could receive the finger 133 at the distal end of each mounting element 132.

Figure 7:
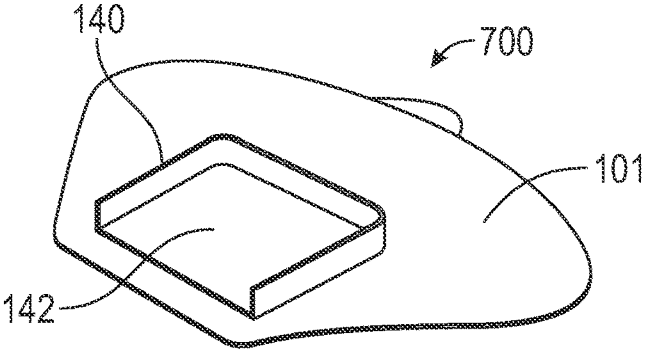
FIG. 7 is a perspective view of an embodiment of an adhesive skin mount where the mounting element comprises a receiving wall.

FIG. 7 illustrates another embodiment of an adhesive mount 7 with another type of mounting element. In this instance, a raised wall 140 creates a generally U-shaped mounting area where a device could be mounted. The raised wall 140 could include an inwardly turned lip that runs around all or portions of the raised wall 140 and which could be received in mounting groove of a device that is to be mounted to the adhesive mount 700.

Figure 8:
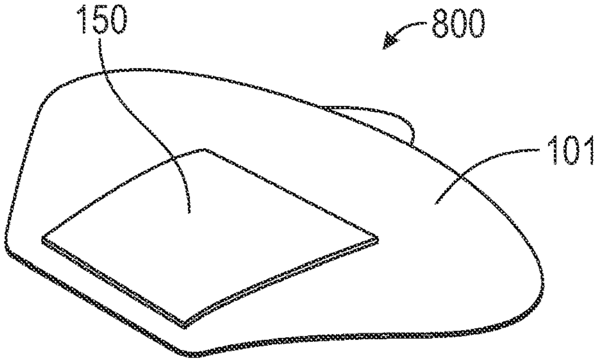
FIG. 8 is a perspective view of an embodiment of an adhesive skin mount where the mounting element includes a layer of hook and loop fastener.

FIG. 8 illustrates another embodiment of an adhesive mount 800 that includes a mounting pad 150 that comprises a layer of hook and loop material. In one embodiment, the mounting pad 150 could be the loop part of a mating pair of hook and loop fasteners. In this case, a hook pad of the pair would be located on the device that is to be attached to the adhesive mount 800. The device would be attached to the adhesive mount 800 by pressing the hook pad on the device into the loop pad 150 on the adhesive mount 800. In this embodiment, the hook/loop pad 150 would need to be attached to the top surface of the flexible layer 102 of the multilayer structure 101.

In an alternate embodiment, the mounting pad 150 could comprise the hooks and a loop pad could be provided on the device which is to be attached to the adhesive mount 800. In this case, one would mount the device to the adhesive mount 800 by pressing the loop pad on the device into engagement with the hook pad 150 on the adhesive mount 800.

Regardless of where hooks are located or where the loops are located, such a mounting arrangement makes it easy to selectively position and reposition the device on the adhesive mount 800 in any of many different locations. This makes it possible to selectively adjust the position of the device relative to the adhesive mount 800.

If we assume that the adhesive mount 800 is attached to the skin of an individual, the adhesive mount 800 itself will not move relative to the individual. However, this type of hook and loop attachment system makes it possible to selectively adjust or set the position of the device relative to the individual. If the device is one that is intended to deliver a vibration or some other type of physical stimulation to the individual, the hook and loop fastening arrangement makes it possible to selectively adjust the part of the individual to which the stimulation is applied.

In the embodiment illustrated in FIG. 8, a single hook/loop pad 150 is provided on the top surface of the multilayer structure 101. In alternate embodiments, there could be multiple hook/loop pads or strips that take on various configurations or shapes.

Figure 9:
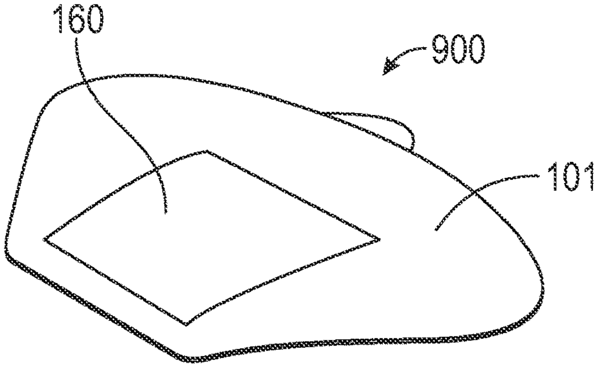
FIG. 9 is a perspective view of an embodiment of an adhesive skin mount where the mounting element includes a magnetic layer.

FIG. 9 shows another embodiment of an adhesive mount 900 which includes a magnetic mounting pad 160. The magnetic mounting pad 160 would be configured to attract a corresponding magnetic mounting pad or pads on a device that is to be mounted to the adhesive mount 900. Alternatively, there could simply be a metal plate on the device, where the metal plate on the device is attracted to the magnetic pad 160 of the adhesive mount 900.

Similarly, there could be a metal plate 160 on the adhesive mount 900, and a corresponding magnetic pad or pads would be provided on the device which is to me mounted on the adhesive mount 900. The magnetic pad of the device would be attracted to the metal pad 160 on the adhesive mount 900 to mount the device to the adhesive mount 900.

In alternate embodiments, there could be a plurality of individual magnetic strips on the adhesive mount, or a plurality of metal strips on the adhesive mount 900 that are arranged in a certain pattern. Corresponding magnetic or metal pads or strips would be provided on the device which is to be attached to the adhesive mount 900. Providing a plurality of metal or magnetic strips that are arranged in a certain pattern on the adhesive mount 900 and/or the device could make it possible to mount the device at a plurality of different locations relative to the adhesive mount 900. This, in turn, would make it possible to selectively adjust the location to which the device applies stimulation to the individual wearing the adhesive mount 900.

The magnetic field strength of the magnetic pad 160 could be adjusted to provide varying degrees of holding strength. The magnetic pad 160 could be mounted on the top of the flexible layer 102 of the multilayer structure 101. Alternatively, the magnetic pad could be located between the flexible layer 102 and the adhesive layer 104, or beneath the adhesive layer 104.

Figure 10A:
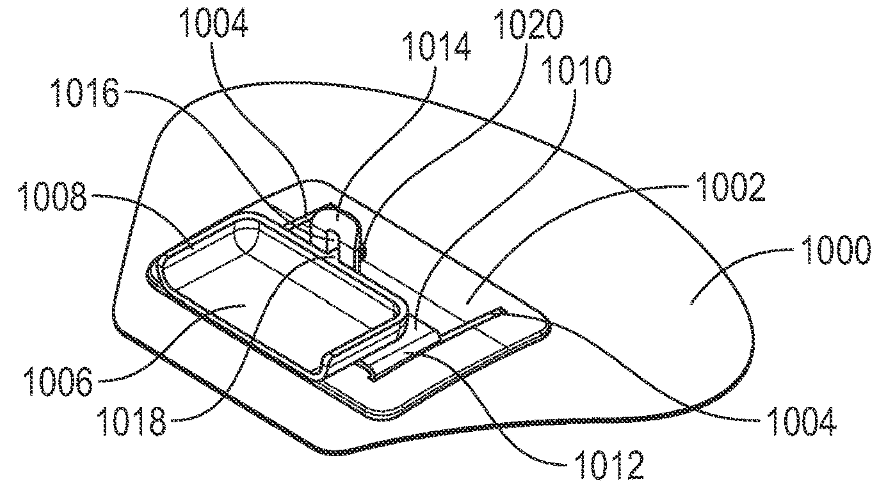
FIGS. 10A-10C illustrate an embodiment of an adhesive skin mount that can selectively adjust a position of a device that is attached to the mount.
Figure 10B:
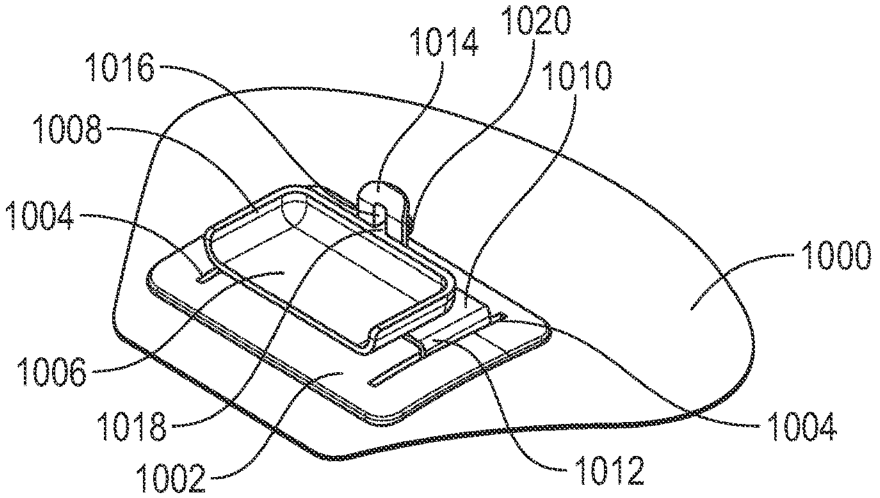
Figure 10C:
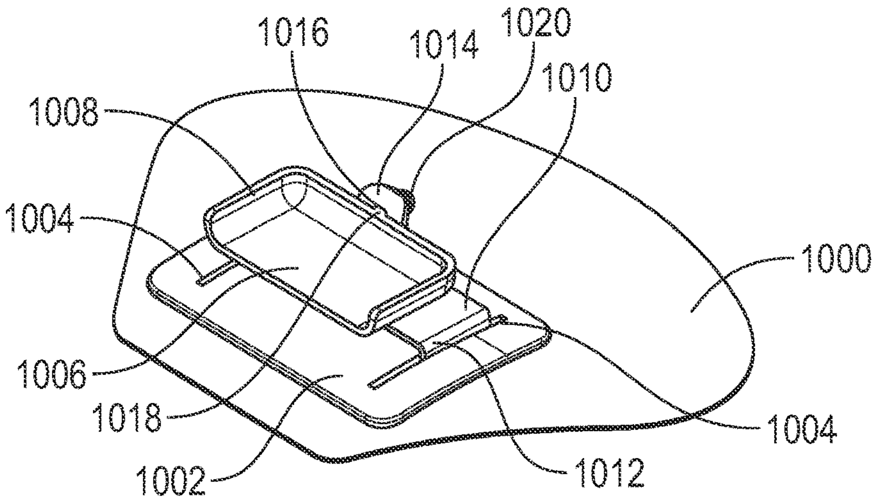

FIGS. 10A-10C illustrate another type of adhesive mount 100 which includes a movable mounting tray to which a device can be attached. This type of adhesive mount 1000 also allows the device which is attached to the adhesive mount 1000 to be selectively repositioned relative to the adhesive mount 1000, and thus relative to the person wearing the adhesive mount 1000.

The adhesive mount includes a movable mounting tray 1006 to which a device is attached. An inwardly extending lip or ridge 1008 that extends inward from sidewalls of the mounting tray 1006 could be received in corresponding grooves of the device to attach the device to the mounting tray 1006. Of course, this is just one way of attaching a device to the mounting tray 1006. There are many alternatives ways of attaching a device to the mounting tray 1006, as would be apparent to those of skill in the art.

A rearwardly protruding mounting post 1018 is provided on the back side of the mounting tray 1006. The end of the mounting post 1018 could be threaded, and a threaded nut 1020 could be engaged with the threads on the mounting post 1018.

A sliding carriage 1010 is interposed between the mounting tray 1006 and a slotted plate 1002 which is attached to the top of the adhesive layers of the adhesive mount 1000. Feet 1012 extend downward from opposite ends of the sliding carriage 1010, and those feet 1012 are mounted within slots 1004 of the slotted plate 1002. The feet 1012 can slide along the slots 1004 of the slotted plate 1002 to selectively position the sliding carriage 1010 relative to the adhesive mount 1000.

FIG. 10A shows the sliding carriage 1010 and the attached mounting tray 1006 at a first location located towards the front of the adhesive mount 1000. FIG. 10B shows the sliding carriage 1010 and the attached mounting tray 1006 at a second location further back relative to the adhesive mount 1000. The sliding carriage 1010 and the attached mounting tray 1006 could be positioned anywhere along the slots 1004 between the position illustrated in FIG. 10A and the position illustrated in FIG. 10B.

Friction between the feet 1012 and the slots 1004 could hold the sliding carriage 1010 at a particular position relative to the adhesive mount. Of course, some type of fixation of locking mechanism could also be provided to hold the sliding carriage 1010 at a selected position relative to the adhesive mount 1000. Also, detent mechanisms could be provided on one or both of the feet 1012 and the slots 1004 to ensure that the sliding carriage 1010 can be held in any of multiple different preferential positions relative to the adhesive mount 1000.

As illustrated in FIGS. 10A-10C, the mounting post 1018 of the mounting tray 1006 extends through a slot 1016 of a mounting tab 1014 that extends upward from the sliding carriage 1010. The threaded nut 1020 can be used to fix a height of the mounting tray 1006 relative to the mounting tab 1014, and thus the height of the mounting tray relative to the adhesive mount 1000. If the mounting tray is positioned above the sliding carriage 1010, it may also be possible to tilt the mounting tray 1006 relative to the sliding carriage 1010 and to fix the mounting tray in the tilted orientation by tightening the threaded nut 1020.

An adhesive mount 1000 as depicted in FIGS. 10A-10C allows a device attached to the mounting tray 1006 to be mounted in multiple ways relative to the adhesive mount 1000, and thus relative to an individual wearing the adhesive mount 1000. Unlike some of the other adhesive mounts discussed above, the adhesive mount 1000 depicted in FIGS. 10A-10C make it possible to adjust a height of the device relative to the adhesive mount 1000.

As explained above, a device that is attached to the adhesive mount could be configured to deliver sexual stimulation to a specific part of a person's anatomy. This would likely require that the device be fairly precisely located on the person's body. An adhesive mount as described above allows one to very precisely position and reposition such a device with respect to a desired portion of a person's anatomy.

In addition, because the adhesive mount will not move with respect to a person's skin, even when the person moves about, an adhesive mount can ensure that the device remains properly positioned with respect to a specific part of a person's anatomy. This is in contrast to known mounting devices such as a harness or an item of clothing, both of which could allow the device to move about on the person's body, particularly if the person is moving around. Thus, an adhesive mount is better at keeping a device properly positioned on a person's body than other known device mounting arrangements.

Some devices provide sexual stimulation by delivering vibrations to a specific part of a person's body. In some instances, it may be desirable for only one or only a few points of contact to be made between the vibrating device and the person's anatomy. In that instance, vibrations that the device delivers to the person's body via the mounting arrangement may be undesirable. If this is the case, the mounting elements 110 that extend from the adhesive mount 100 and that are used to attach a device to the adhesive mount 100 could be specifically designed to not transmit vibrations from the attached device to the person's skin. Also, in this instance it may be desirable for the mounting elements to be attached to the top surface of the multilayer structure 101. This may also help to prevent conducting vibrations to the person's skin since any vibrations would have to be conducted through the layers of the multilayer structure 101. An example of this is depicted in FIG. 3A of the application.

In other instances, it may be the case that it is desirable for vibrations generated by the device attached to the adhesive mount 100 to be conducted to the person's skin through the adhesive mount 100. In this instance, the mounting elements 110 could be configured specifically to conduct vibrations to the person's skin. Also, in this instance it may make sense for the mounting elements 110 to protrude downward through all layers of the adhesive mount 100 so that the bottom surfaces of the mounting elements 110 are in contact with a person's skin. An example of this is depicted in FIG. 3C of the application.

The shape of the adhesive mount could be selectively varied depending on the location on a person skin that the adhesive mount is to be attached, and depending shape and configuration of the device which is to be attached to the adhesive mount.

While the foregoing description refers to attaching a device to a person's skin using an adhesive mount, and adhesive mount as disclosed herein could have applicability on being other than humans. For example, an adhesive mount as disclosed herein could be used in the treatment of animals to attach a device to the skin of a dog or a cat. Thus, the uses to which the disclosed adhesive mount can be put are not limited to use with humans.

Likewise, the device that is attached to an adhesive mount could be virtually any type of device. For example, the disclosed adhesive mounts could be used in a medical context to help attach a treatment or monitoring device to the skin of a patient.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An adhesive mount for removably attaching a device to skin of a body, comprising:

a flexible layer having first and second sides;

an adhesive layer having a first side in contact with the first side of the flexible layer, a second side of the adhesive layer being configured to removably adhere to skin;

a release layer that is removably attached to the second side of the adhesive layer; and an elongated anchor strip that is attached to at least one of the flexible layer and the adhesive layer; and first and second mounting elements that are coupled to different portions of the elongated anchor strip and that project upward from the second side of the flexible layer, wherein the elongated anchor strip is configured to hold the first and second mounting elements a substantially fixed distance apart but to also flex to conform to a curved portion of skin, and wherein distal ends of the first and second mounting elements are configured to engage with corresponding securing elements of a device to couple the device to the adhesive mount.

2. The adhesive mount of claim 1, wherein the elongated anchor strip is located under the first side of the flexible layer and wherein each of the first and second mounting elements comprises a post that protrudes through the flexible layer.

3. The adhesive mount of claim 1, wherein the elongated anchor strip is flat and provides sufficient rigidity that the elongated anchor strip helps the adhesive mount to retain its shape.

4. The adhesive mount of claim 1, wherein the elongated anchor strip is attached to the first side of the adhesive layer and wherein the first and second mounting elements extend through the flexible layer.

5. The adhesive mount of claim 1, wherein the elongated anchor stripe comprises a flat strip that extends across a first portion of the flexible layer, wherein the first mounting element comprises a first post coupled to a first end of the elongated anchor strip and wherein the second mounting element comprises a second post coupled to a second end of the elongated anchor strip.

6. The adhesive mount of claim 5, wherein the elongated anchor strip comprises a first elongated anchor strip, the adhesive mount further comprising:
- a second elongated anchor strip that is attached to at least one of the flexible layer and the adhesive layer;
- a third post coupled to a first end of the second elongated anchor strip; and
- a fourth post coupled to a second end of the second elongated anchor strip;
- wherein the third and fourth posts project upward from the second side of the flexible layer, wherein the second elongated anchor strip is configured to hold the third and fourth posts a substantially fixed distance apart but to also flex to conform to curved portion of skin and wherein the third and fourth posts are configured to engage with corresponding securing elements of a device to couple the device to the adhesive mount.

7. The adhesive mount of claim 1, wherein the elongated anchor strip is attached to the second side of the adhesive layer and wherein the first and second mounting elements protrude through both the adhesive layer and the flexible layer.

8. The adhesive mount of claim 1, wherein each of the first and second mounting elements comprises an elongated member and wherein the elongated member comprises a reduced diameter portion that is configured to engage with a securing element of a device to couple the device to the adhesive mount.

9. The adhesive mount of claim 1, wherein each of the first and second mounting elements comprises a mounting post, the mounting post comprising:
- a shaft having a first diameter;
- a base located at a first end of the shaft, the base having a second diameter that is larger than the first diameter; and
- a head located at a second end of the shaft, the head having a third diameter that is larger than the first diameter.

10. The adhesive mount of claim 9, wherein the mounting post further comprises a collar that substantially surrounds the shaft at a location between the first end and the second end of the shaft, wherein the collar has a fourth diameter that is larger than the first diameter.

11. The adhesive mount of claim 10, wherein the fourth diameter is larger than the third diameter and wherein the second diameter of the base is larger than the fourth diameter of the collar.

12. The adhesive mount of claim 1, wherein the first and second mounting elements are configured to transmit vibration from a device that is attached to distal ends of the first and second mounting elements to proximal ends of the first and second mounting elements.

13. The adhesive mount of claim 1, wherein the first and second mounting elements are configured to dampen vibratory motion of a device that is attached to distal ends of the first and second mounting elements such that at least some of the vibratory motion of the device is not transmitted to a proximal ends of the first and second mounting elements.

14. An adhesive mount for removably attaching a device to skin of a body, comprising:
- a flexible adhesive layer having first and second sides, wherein the second side of the adhesive layer is configured to removably adhere to skin;
- a semi-rigid elongated anchor strip that is attached to adhesive layer;
- a first mounting element attached to a first end of the semi-rigid elongated anchor strip, the first mounting element projecting upward from the first side of the flexible adhesive layer; and
- a second mounting element attached to a second end of the semi-rigid elongated anchor strip, the second mounting element projecting upward from the first side of the flexible adhesive layer;
- wherein the semi-rigid elongated anchor strip is configured to hold the first and second mounting elements a substantially fixed distance apart but to also flex to conform to a curved portion of skin, and wherein distal ends of the first and second mounting elements are configured to engage with corresponding securing elements of a device to couple the device to the adhesive mount.

15. The adhesive mount of claim 14, wherein the semi-rigid elongated anchor strip is attached to the second side of the adhesive layer, and wherein the first and second mounting elements protrude through the adhesive layer.

16. The adhesive mount of claim 14, further comprising a flexible layer having a first side attached to the first side of the adhesive layer, wherein the semi-rigid elongated strip is located between the adhesive layer and the flexible layer, and wherein the first and second mounting elements protrude through the flexible layer.

17. The adhesive mount of claim 14, wherein the semi-rigid elongated anchor strip comprises a first semi-rigid elongated anchor strip, the adhesive mount further comprising:
- a second semi-rigid elongated anchor strip that is attached to the adhesive layer;
- a third mounting element attached to a first end of the second semi-rigid elongated anchor strip, the third mounting element projecting upward from the first side of the flexible adhesive layer; and
- a fourth mounting element attached to a second end of the second semi-rigid elongated anchor strip, the fourth mounting element projecting upward from the first side of the flexible adhesive layer;
- wherein the second semi-rigid elongated anchor strip is configured to hold the third and fourth mounting elements a substantially fixed distance apart, but to also flex to conform to a curved portion of skin, and wherein distal ends of the third and fourth mounting elements are configured to engage with corresponding securing elements of a device to couple the device to the adhesive mount.

18. The adhesive mount of claim 17, further comprising a flexible layer having a first side attached to the first side of the adhesive layer, wherein the first and second semi-rigid elongated strips are located between the adhesive layer and the flexible layer, and wherein the first, second, third and fourth mounting elements protrude through the flexible layer.

19. The adhesive mount of claim 1, wherein the first mounting element is attached to a first end of the elongated anchor strip and wherein the second mounting element is attached to a second end of the elongated anchor strip.

20. The adhesive mount of claim 1, wherein the elongated anchor strip extends across a first portion of the adhesive mount, and wherein the elongated anchor strip is configured to prevent the first portion of the adhesive mount from developing a wrinkle when the adhesive mount is adhered to skin.

* * * * *